US006474603B1

(12) United States Patent
Kinkead et al.

(10) Patent No.: US 6,474,603 B1
(45) Date of Patent: *Nov. 5, 2002

(54) FLIGHT CONTROL SYSTEM FOR A HYBRID AIRCRAFT IN THE PITCH AXIS

(75) Inventors: W. Douglas Kinkead, Wallingford, CT (US); Mark W. Scott, Bethany, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/962,038

(22) Filed: Sep. 25, 2001

(51) Int. Cl.[7] .............................................. G05D 13/00
(52) U.S. Cl. .................. 244/195; 244/76 B; 244/17.13
(58) Field of Search ................................ 244/195, 185, 244/23 B, 6, 182, 76 B, 225, 17.13; 701/301.4, 7, 10; 340/967, 969, 970

(56) References Cited

U.S. PATENT DOCUMENTS

| | | | | |
|---|---|---|---|---|
| 3,282,534 A | * | 11/1966 | Serriades | 244/12.3 |
| 5,454,531 A | * | 10/1995 | Melkuti | 244/12.6 |
| 5,890,441 A | * | 4/1999 | Swinson et al. | 244/12.1 |
| 6,170,778 B1 | * | 1/2001 | Cycon et al. | 244/12.3 |
| 6,270,038 B1 | * | 8/2001 | Cycon et al. | 244/12.2 |

* cited by examiner

Primary Examiner—Robert P. Swiatek
Assistant Examiner—Timothy D. Collins
(74) Attorney, Agent, or Firm—Carlson Gaskey & Olds

(57) ABSTRACT

A flight control system includes a blending algorithm which evaluates the current flight regime and determines the effectiveness of the flight controls to effect the rotational moment of a hybrid vehicle about the pitch axis. Gain schedules for both pitch cyclic and elevator control provide a quantitative measure of control effectiveness. Based on the respective gain schedules, the algorithm determines how much of the control commands should be sent to each control surface. The result is that for a given control command, the same amount of pitch moment will be generated regardless of flight regime. This simplifies the underlying flight control law since the commands it generates are correct regardless of flight regime.

19 Claims, 7 Drawing Sheets

FLIGHT CONTROL SYSTEM FOR A HYBRID AIRCRAFT IN THE PITCH AXIS

This invention was made with government support under Contract No.: M67854-99C-2081 awarded by the Department of the Army. The government therefore has certain rights in this invention.

BACKGROUND OF THE INVENTION

The present invention relates to a flight control system for a hybrid aircraft, and more particularly, to a flight control system for a hybrid unmanned aerial vehicle (UAV) which blends command signals to a multiple of vehicle control surfaces during transition between rotor borne and wing borne flight.

There is an increased emphasis on the use of UAVs for performing various activities in both civilian and military situations where the use of manned flight vehicles may not be appropriate. Such missions include surveillance, reconnaissance, target acquisition, target designation, data acquisition, communications relay, decoy, jamming, harassment, ordinance delivery, or supply.

A hybrid aircraft provides the hover and low-speed maneuverability of a helicopter with the high-speed forward flight and duration capabilities of a winged aircraft. Typically, hybrid aircraft include a helicopter control surface system which provides cyclic pitch, collective pitch and differential rotation to generate lift, pitch, roll, and roll control when operating in a hover/low-speed environment. Additionally, the hybrid aircraft includes a conventional fixed wing aircraft control surface system such as aileron, elevator, rudder and flaps to provide control when operating in a high-speed environment. Hybrid aircraft also typically include a separate translational propulsive system.

When the hybrid aircraft is operating in a hover/low-speed environment, maneuverability is achieved by controlling the helicopter control system. When the hybrid aircraft is operating in a high-speed environment, the hybrid aircraft operates as a fixed wing aircraft and maneuverability is achieved by controlling the aircraft flight control surfaces. As the hybrid aircraft transitions between helicopter and aircraft control surface systems, however, neither the helicopter nor the aircraft control systems are completely effective. Moreover, the relationship between control displacement and control moment is nonlinear and the aerodynamic forces on the aircraft change most dramatically. Flight control within this region is therefore rather complex.

Accordingly, it is desirable to provide a hybrid aircraft flight control systems which automatically blends command signals to a multiple of vehicle flight control surfaces during transition between rotor borne and wing borne flight. It is further desirable to provide the same amount of vehicle movement regardless of the vehicle's flight regime.

SUMMARY OF THE INVENTION

Hybrid aircraft include a flight control system according to the present invention. A hybrid aircraft can hover like a helicopter using a rotor system or fly like a fixed wing aircraft using conventional fixed wing controls such that it is operable in four flight regimes:

1. Hover—Defined as low speed operation. The rotor generates control and lift.
2. Forward Flight—Lift is generated by the wings and all control is through the fixed wing surfaces (elevator, ailerons, rudder)
3. Transition Up—This mode guides operation of a multiple of control surfaces when flying from Hover to Forward Flight.
4. Transition Down—This mode guides operation of a multiple of control surfaces when flying from Forward Flight to Hover.

The flight control system according to the present invention includes a blending algorithm which evaluates the current flight regime and determines the effectiveness of the various flight control surfaces. In the pitch axis, gain schedules for pitch cyclic (rotor) and elevator control are used as a quantitative measure of control effectiveness. Based on the respective gain schedules, the blending algorithm determines how much of an input command is sent to each control surface. The result is that for a given command, the same amount of pitch moment will be generated regardless of flight regime. This simplifies the underlying flight control laws since the commands it generates are correct regardless of flight regime.

The present invention therefore provides a hybrid aircraft flight control system which automatically blends pitch command signals between pitch cyclic and aileron flight control surfaces during transition between rotor borne and wing borne flight.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
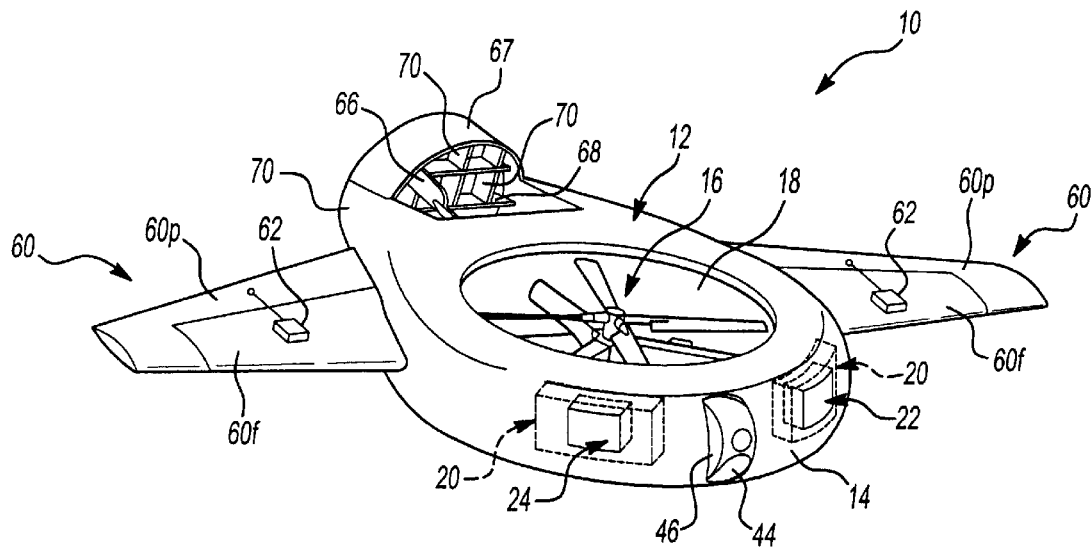
FIG. 1 is a general perspective view of an exemplary hybrid aircraft having a flight control system according to the present invention.

FIG. 1 illustrates a hybrid aircraft 10, such as the Unmanned Aerial Vehicle (UAV) developed by Sikorsky Aircraft Corporation. For further understanding of the UAV embodiment and associated components thereof, attention is directed to patent application Ser. No. 09/296,624 filed Apr. 22, 1999 and entitled "Unmanned Aerial Vehicle With Counter-Rotating Ducted Rotors and Shrouded Pusher-Prop," which is assigned to the assignee of the instant invention and which is hereby incorporated herein in its entirety. It should be further understood that other hybrid aircraft (manned and unmanned) having multiple flight control surfaces will also benefit from the instant invention.

The aircraft 10 includes a fuselage 12 with a toroidal portion 14 having a generally hemi-cylindrical aerodynamic profile. A rotor assembly 16 is mounted within a duct 18 that extends substantially vertically through the fuselage 12. The fuselage 12 includes a plurality of accessible internal bays 20 for housing and/or storing aircraft flight and mission components. Preferably, the bays house a powerplant system 22 and a flight control system 24.

Figure 1A:
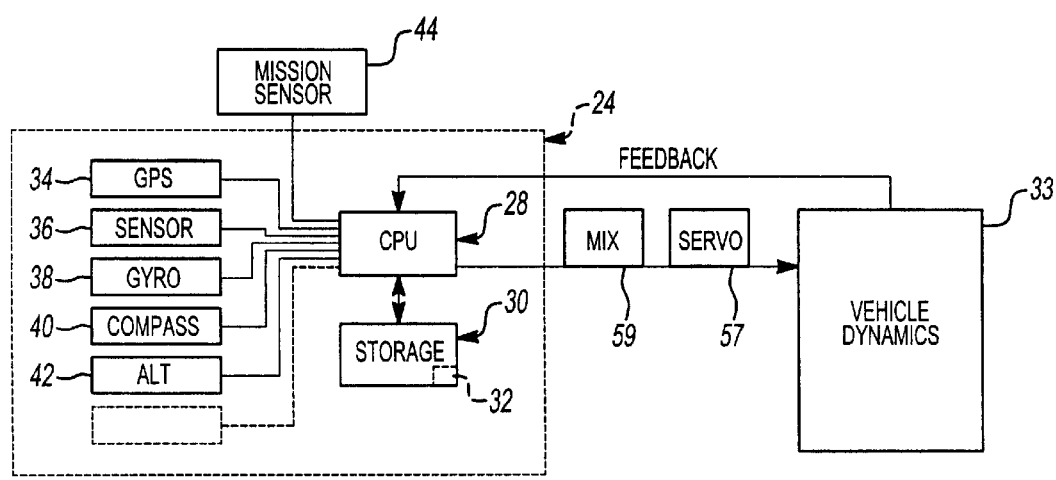
FIG. 1A is a block diagram of the flight control system.

The flight control system 24 preferably includes a CPU 28 and storage device 30 connected to the CPU 28 (FIG. 1A). The storage device 30 may include a hard drive, CD ROM, DVD, RAM, ROM or other optically readable storage, magnetic storage or integrated circuit. As will be further described, the storage device 30 contains a database 32 including preprogrammed flight control law strategy associated with a blending algorithm for the control of the vehicle dynamics (illustrated schematically at 33) through servo actuators and a mixing circuit or the like. The control strategy preferably maintains parameters such as pitch attitude, roll attitude and heading at a desired point to provide control of the vehicle 10.

The flight control system 24 may alternatively or additionally include a Primary Flight Control System (PFCS) and an Automatic Flight Control Systems (AFCS) as are well known. The AFCS and PFCS software algorithms may be stored in the storage device 30 or alternatively in removable ROM, RAM or flash memory. The AFCS and PFCS provide feedback mechanisms having linear control system logic such as proportional, integral, derivative (PID) paths to achieve the desired response and compensate for undesired destabilization forces acting on the vehicle 10.

The flight control system further includes transmitters, receivers, navigation, sensors and attitude sensors, such as a GPS receiver 34 and multi-axis accelerometers 36. The flight control system 24 may alternatively or additionally include one or more gyros 38, a compass 40, and an altimeter 42, all connected to the CPU 28 to detect vehicle dynamics and flight path parameters. The sensors may also include any device capable of outputting an acceleration vector signal representing sensed vehicle motion and/or receiving control surface displacement. Such devices (as well as others) are well known in the aircraft field.

Other mission related sensors 44 (also illustrated in FIG. 1), such as a camera system, forward looking infrared radar (FLIR) sensor, laser designator, thermal imager, or the like are also preferably located in a trainable turret 46 (FIG. 1) in a forward area of the vehicle 10. It should be understood that although a particular component arrangement is disclosed in the illustrated embodiment, other arrangements will benefit from the instant invention.

Figure 1B:
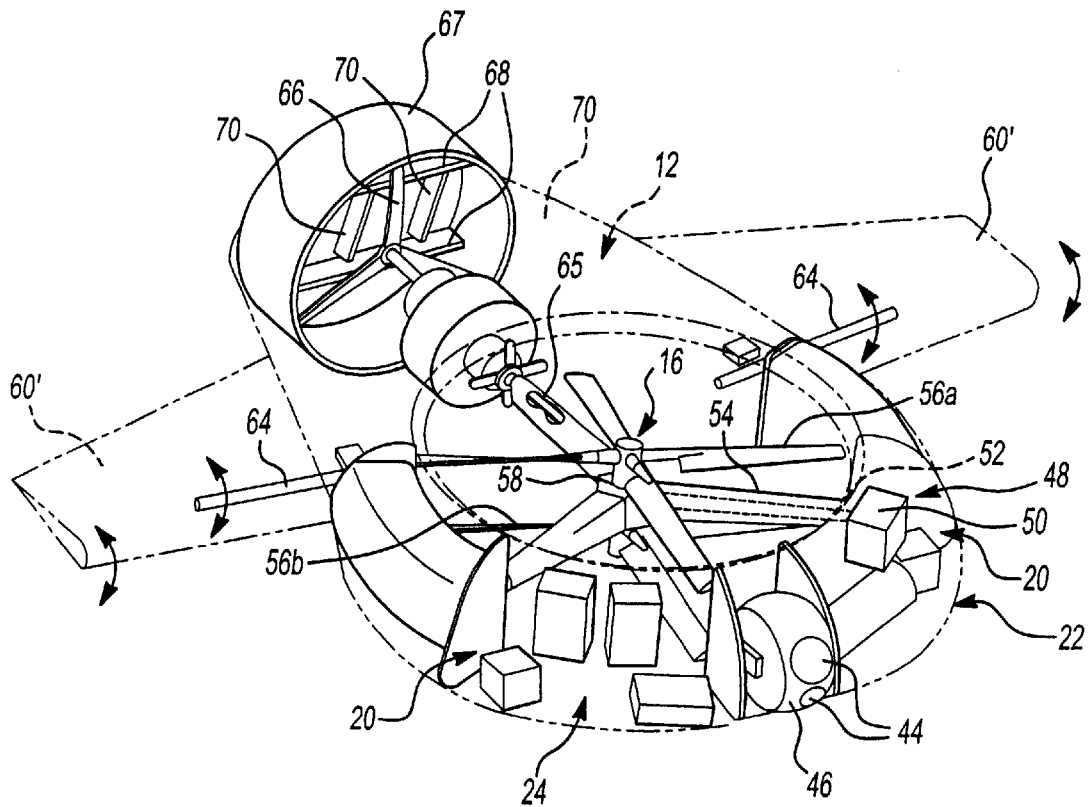
FIG. 1B is a partially phantom view of another exemplary hybrid aircraft having a flight control system according to the present invention.

Referring to FIG. 1B, a drive train assembly 48 is operative for transferring power developed by an engine (illustrated schematically at 50) to the rotor assembly 16 by a drive shaft 52. A plurality of hollow struts 54 extend between the fuselage 12 and the rotor assembly 16 to support the rotor assembly 16 therein. The support struts 54 provide structural rigidity to the aircraft duct 18 to prevent flight and ground loads from distorting the fuselage 12 and provide conduits for interconnecting operating elements of the aircraft 10 such as the engine drive shaft 52 and electrical wiring for various operating components.

The rotor assembly 16 includes a pair of multi-bladed, counter-rotating rotors 56a, 56b, coaxially aligned with the duct 18, and a coaxial transmission subassembly therebetween (illustrated somewhat schematically at 58). Each counter-rotating rotor 56a, 56b preferably includes a plurality of blade assemblies in which blade pitch changes induced in the counter-rotating rotor systems 56a, 56b, i.e., cyclic and/or collective pitch inputs, can be utilized to generate lift, pitch, yawl, and roll control of the aircraft 10. Roll control is preferably provided by roll cyclic of the multi-bladed, counter-rotating rotors 56a, 56b through upper and lower swashplates (FIG. 1A, illustrated schematically at 57) which are controlled through a mixer circuit (FIG. 1A; illustrated schematically at 59) or the like.

Wings 60 extend laterally outward from the aircraft fuselage 12 to provide high lifting forces and a large nose-down pitching moment in forward translational flight. Those skilled in the art would readily appreciate the diverse wing arrangements that can be incorporated into a UAV according to the present invention. Preferably, each wing 60 includes a fixed stub portion 60F and a pivotal flight control surface portion 60P such as a flaperon or aileron. The flight control surface portion 60P preferably includes a flaperon hingedly mounted to the trailing edge of the wing 60. A servo actuator 62 mounted within the fixed portion 60F controls the pivoting of the pivotal portion 60P (FIG. 1A). Alternatively, or in addition, the entire wing 60' may pivot such that a drive rod 64 independently changes the angle of attack of the wing 60' (FIG. 1B).

In order to provide translational thrust, the aircraft 10 includes a pusher prop 66 mounted to the rear of the vehicle 10. The propeller 66 is mounted to a drive shaft 65 which, in turn, is engaged with the powerplant subsystem through a flexible coupling or the like. The prop 66 is preferably mounted to the rear of the aircraft with its rotational axis oriented substantially horizontal.

A prop shroud 67 is formed on the aft fuselage 70 and around the pusher prop 66. The cross-sectional shape of the shroud 67 is preferably configured as an airfoil to provide the shroud 68 with some lift component. Mounted on the shroud 68 aft of the pusher prop 66 are one or more horizontal and vertical control surfaces 68, 70. Preferably, the control surfaces 68, 70 are pivotally mounted to the shroud 67 to permit the exhausted air to be channeled in a controllable manner such that the horizontal control surfaces 68 function as elevators and the vertical control surfaces 70 function as rudders.

Figure 2A:
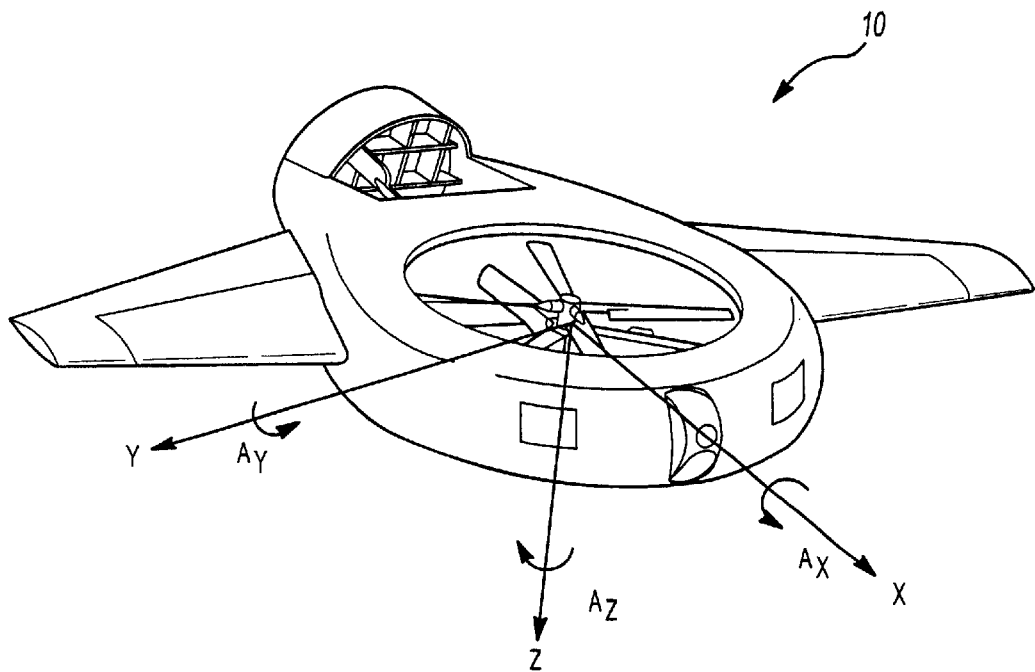
FIG. 2A is a schematic representation of vector axes superimposed on the vehicle of FIG. 1.
Figure 2:
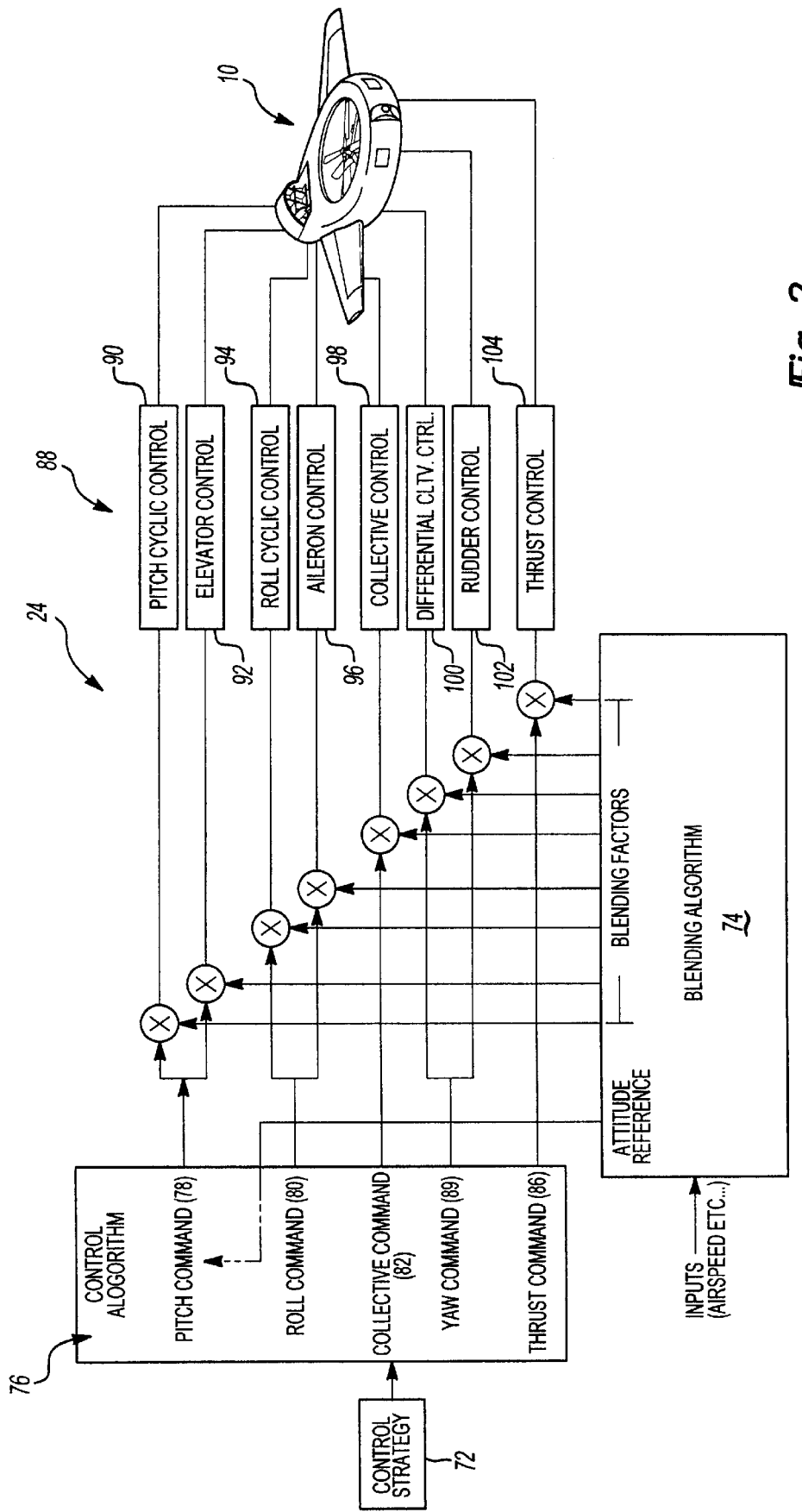
FIG. 2 is a general schematic block diagram of the flight control law strategy provided by the flight control system of FIG. 2.

Referring to FIG. 2, a block diagram of the inventive flight control system 24 having a flight control law strategy 72 including a control algorithm 76 and a blending algorithm 74 is schematically illustrated. The flight control law strategy 72 provides input to the control algorithm 76 to direct the vehicle 10. The blending algorithm 74 insures smooth, controllable flight in all flight regimes. This is of particular importance in the transition flight region. Below transition, the aircraft maneuvers like a helicopter utilizing aircraft control surfaces exclusively for control. Above transition, the aircraft maneuvers like a fixed wing airplane utilizing the movable wing portion 60P exclusively for roll control. Above and below transition, the appropriate control surface is provided with full authority. That is, below transition, the rotor system is movable through its entire control range and above transition, the aircraft control surfaces are movable through their entire control range. During transition, the aircraft uses both the rotor system the aircraft controls surfaced. In this region, the relationship between control displacement and control moment is most nonlinear. Transition is also the region where the aerodynamic forces on the aircraft change most dramatically. The blending algorithm compensates for these effects and thereby improves control.

The flight control strategy 72 includes a control algorithm 76 to output a pitch command 78, a roll command 80, a collective command 82, a yaw command 84 and a thrust command 86. The flight control commands 78–86 are generated by manual input from a remote operator, the flight control system 24 or a combination thereof.

Orthogonal vector axes superimposed on the vehicle 10 (FIG. 2A) illustrate that the pitch command 78 provides angular moment about the Y axis (Ay); the roll command 80 provides angular moment about the X axis (Ax); the collective command 82 provide translational moment along the Z axis; the yaw command 84 provides angular moment about the Z axis (Az); and the thrust command 86 provides translation moment about the X axis. It should be understood that numerous hybrid aircraft flight control systems will benefit from the blending algorithm of the instant invention.

The flight control commands 78–86 are output to a multiple of movable control surfaces 88 to achieve the desired moment about the desired axis or axes. In the disclosed embodiment, the movable control surfaces 88 include a pitch cyclic control 90, elevator control 92, roll cyclic control 94, aileron control 96, collective control 98, differential collective control 100, rudder control 102, and thrust control 104.

Each flight control command 78–86 is output to one or more movable control surfaces 90–104 to control the vehicle in a particular axis. The control commands 78–86 are actuating commands which are sent to a servo actuator, a mixing circuit for a plurality of servos which control the swashplates (FIG. 3) or the like which are suitably arranged to control the rotor blades and/or otherwise adjust the deflection of a movable control surface. Preferably, one of the control surfaces 90–104 is primarily a helicopter flight control surface, while the other is primarily a conventional aircraft flight control surface.

In the disclosed embodiment, the pitch command 78 is associated with the pitch cyclic control 90 and the elevator control 92; the roll command 80 is associated with the roll cyclic control 94, and the aileron control 96; the collective command 82 is associated with the collective control 98; the yaw command 84 is associated with the differential collective control 100 and the rudder control 102; and the thrust command 86 is associated with the thrust control 104 (FIGS. 1A and 1B; pusher prop 66). Although particular control surfaces are disclosed in the illustrated embodiment, it should be understood that other combinations of movable control surfaces, and other types of controls such as slats, flaps, flaperons, puffer ducts, articulatable nozzles, elevons, and the like will also benefit from the instant invention. It should be further understood that the term aileron is defined to include conventional ailerons, flaperons, elevons and other controls which provide a pitch moment other than rotor-type cyclic controls.

Figure 3:
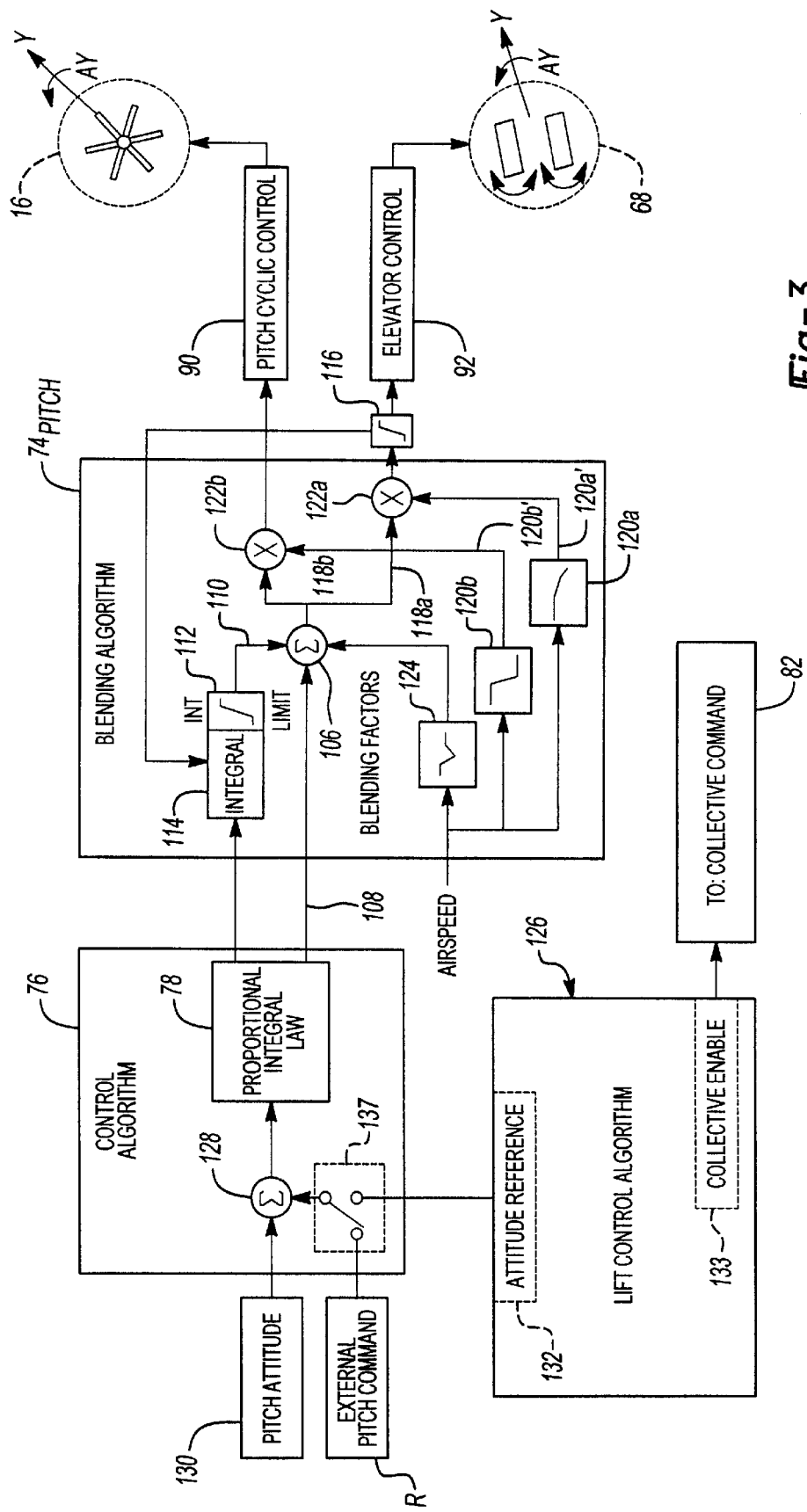
FIG. 3 is a detailed block diagram of one embodiment of a blending algorithm.

Referring to FIG. 3, the blending algorithm 74 in the pitch axis (74pitch) is schematically illustrated. The roll blending algorithm 74pitch is preferably operable when the vehicle is in the transition flight region.

Pitch summing circuit 106 receives the pitch command input 78 (also shown in FIG. 2) preferably in proportional plus integral form. The proportional and integral commands are the primary control commands and are computed by the underlying control laws within the flight control strategy 72. That is, a proportional pitch command 108 is summed with an integral pitch command 110 which has been limited by a limiting circuit 112.

As generally known, limiting circuits prevent a signal from exceeding a certain specified magnitude or dropping below a certain magnitude thereby providing authority limits. Limit 112 controls the rate of the output of the pitch integrator 114. Pitch integrator unit 114 is used to maintain a desired pitch cyclic control 90 and/or elevator control 92 without the necessity of constant displacement of the pitch command 78. It should be understood that commands may alternatively or additionally be split with other flight control surfaces such as the flaperons 60P (FIG. 1A). The limiting circuit 112 preferably prevents the pitch integrator 114 from greatly exceeding a predetermined limit commonly known as "integrator wind-up." To further assure that the pitch integrator 114 does not exceed the maximum travel of the elevator 68, a second limiter 116 is provided in a feed back path. If limiter 116 is reached, limited 116 assists the limit 112 to assure the pitch integrator 114 is held in the limited direction thereby preventing exceeding control surface mechanical limits and integrator wind-up.

Figure 4:
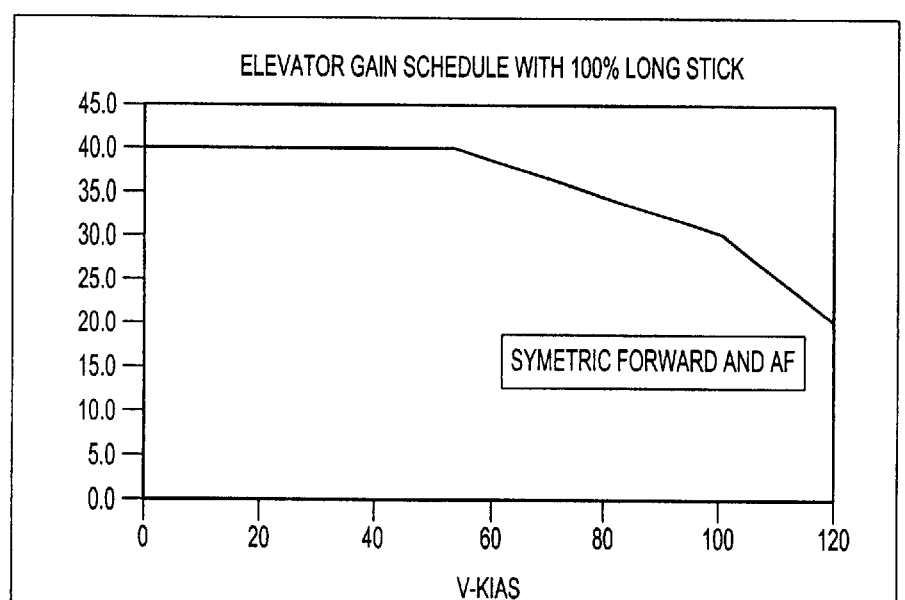
FIG. 4 is one embodiment of an exemplary elevator gain schedule for the vehicle of FIG. 1.
Figure 5:
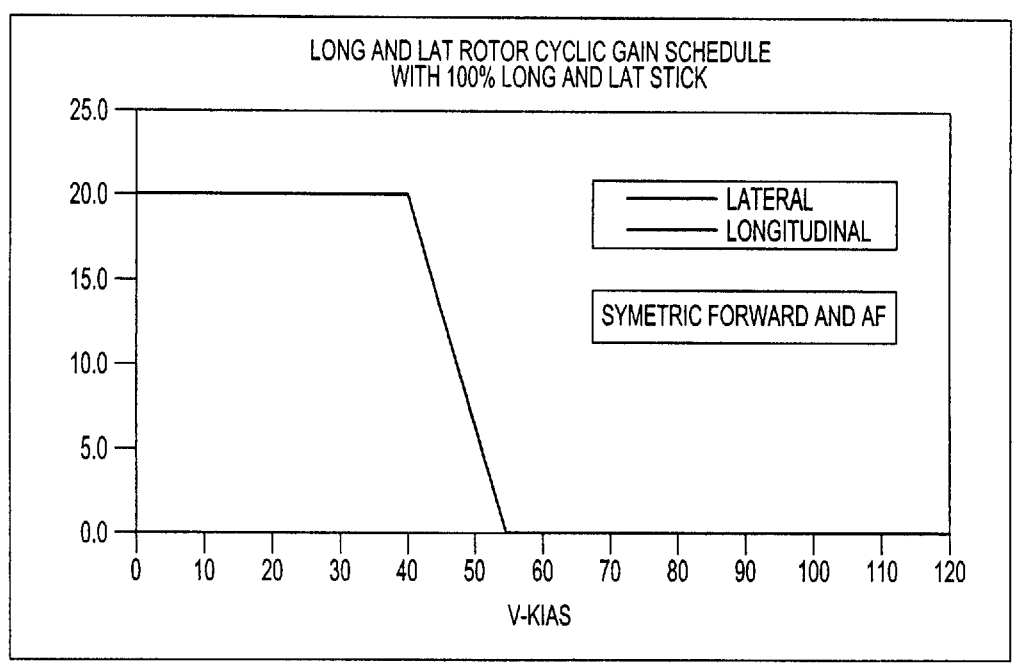
FIG. 5 is one embodiment of an exemplary cyclic pitch gain schedule for the vehicle of FIG. 1.

From the pitch summing circuit 106, the pitch command 78 is split into separate command paths 118a and 118h. Each command path 118a, 118h is respectively multiplied by an elevator gain 120a' and a pitch cyclic gain 120h' at multipliers 122a, 122h. The elevator gain 120a' is determined by an elevator gain schedule 120a (FIG. 4) which relates the velocity (air speed) of the vehicle 10 to allowable elevator control 92 deflection. The pitch cyclic gain 120h' is determined by a pitch cyclic gain schedule 120h (FIG. 5) which relates the velocity (air speed) of the vehicle 10 to the allowable cyclic deflection for the pitch axis. The gain schedules are preferably quantitative measures of control effectiveness.

Based upon the respective gain schedule 120A, 120h, the pitch blending algorithm 74pitch determines how much of the pitch input command 78 is sent to each movable control surface (through the pitch cyclic control 90 and/or elevator control 92.)

For example only, in the illustrated embodiment, no pitch cyclic deflection is available when the velocity of the vehicle 10 exceeds 55 kias. If, for example, the vehicle 10 is travelling at a velocity of 100 kias, the entire pitch command 78 is sent to the elevator (pitch cyclic gain 120h'=0). The elevator deflection is also reduced from its full deflection to about 39 degrees. The decreasing elevator deflection limit accounts for increased vehicle velocity and increased elevator control effectiveness. Preferably, the gain schedules 120a, 120h are determined so that for any given control command, the same amount of vehicle moment will be generated regardless of flight regime. That is, the gain schedules assure that the vehicle responds in a substantially identical manner independent of it velocity. This simplifies the underlying flight control system laws since the command the flight control system generates provide the desired moment regardless of flight regime.

Preferably, the blending algorithm 74pitch manages control limits so that if one control surface is at its maximum limit of travel, the other control surface assists the saturated control surface. That is, the pitch blending algorithm 74pitch adds in additional elevator control authority if the pitch cyclic is at its maximum deflection even if the additional elevator control authority may not be effective. This minimizes the possibility of entering uncontrolled flight due to unavailable control authority.

The main limit is that of the pitch integrator 114. When the pitch cyclic control 90 reaches its full deflection (full saturation), elevator control 92 is added in by the flight control system 24. For example only, if the vehicle is traveling forward at a relatively low velocity, and a large pitch input command 78 is provided, pitch cyclic control 90 may not provide the necessary control authority commanded by the flight control system 24. The blending algorithm 74pitch preferably responds by maintaining the pitch cyclic control 90 at full deflection while adding in elevator control 92 to achieve the desired response.

Figure 6:
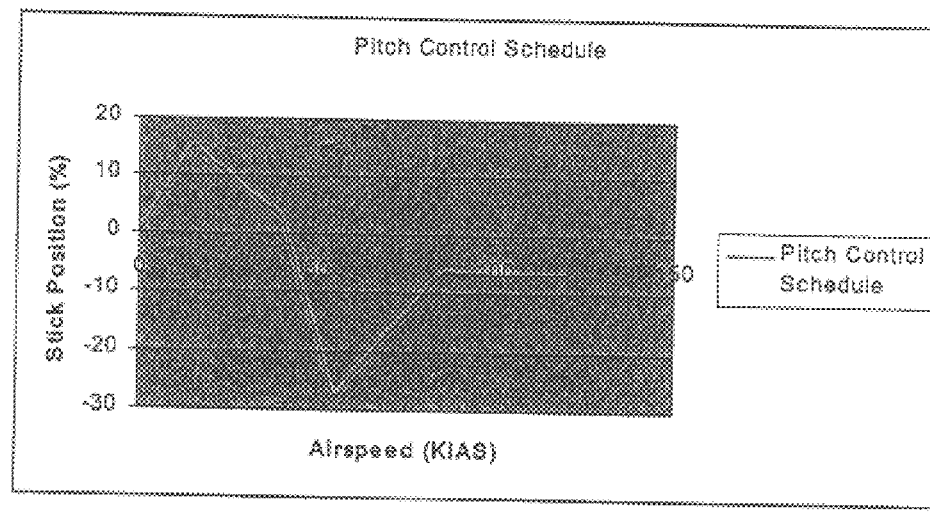
FIG. 6 is one embodiment of an exemplary aircraft pitch control gain schedule for the vehicle of FIG. 1.

An aircraft pitch control gain schedule 124 (also illustrated in FIG. 6) is also added to the pitch command 78 at the pitch summing circuit 106. The pitch control schedule 124 provides a feed forward pitch control signal which provides a predetermined hold or trim to the movable control surface (pitch cyclic control 90 and/or elevator control 92) to compensate for shifts in the trim positions caused by airspeed relative aerodynamic conditions. For example only, airflow adjacent the duct has a predetermined effect upon the pitch of the vehicle 10 relative to airspeed. A particular nose-up pitch effect at a particular airspeed is thereby accounted for by a nose-down pitch trim in the pitch control schedule 124.

A lift control algorithm 126 selectively communicates with the pitch command 78 of the control algorithm 76 through a pitch summing circuit 128. The lift control algorithm 126 controls the pitch attitude of the vehicle 10 when the collective control 98 (FIG. 2) is enabled and when the vehicle is in transition up/down mode. That is, the lift control algorithm 126 control vehicle pitch during transition between hover and forward flight.

Lift summing circuit 128 receives a pitch attitude 130 from the flight control law strategy 72 (FIG. 2) to generate a pitch attitude error. It should be understood that the pitch attitude error is used as an input to the pitch command 78 of the flight control law strategy 72 control algorithm 76 to adjust vehicle pitch attitude. An external manual pitch command from a remote operator (illustrated schematically at R) or the lift control algorithm 126 is selectively provided to the pitch command 78 through the lift summing circuit 128. A lift control enable switch (illustrated schematically at 132) determines which communicates with the lift summing circuit 128 to provide the pitch attitude reference to the pitch command 78. The lift control algorithm 126 also operates a collective enable switch 133. The collective enable switch 133 operates to freeze the collective command 80 at a particular position, e.g., flat pitch at in forward flight mode.

Figure 7:
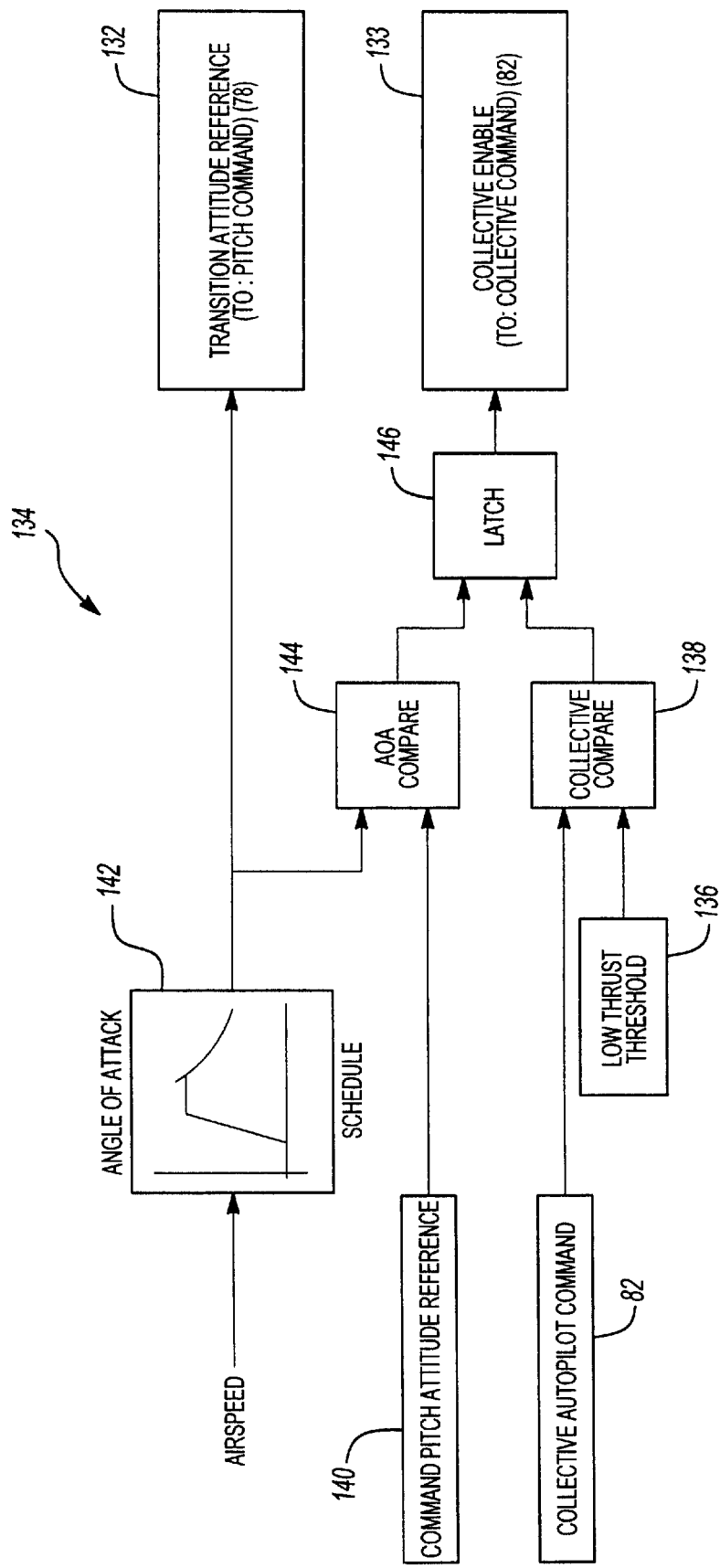
FIG. 7 is a detailed block diagram of one embodiment of a transition logic circuit.

Referring to FIG. 7, a transition logic circuit 134 which operates the lift control enable switch 133 and the collective enable switch 132 is schematically illustrated. The transition logic circuit 134 determines vehicle operation within each flight mode and determines when to switch flight modes. The flight modes are:

1. Hover—Defined as low speed operation. The rotor generates control and lift.
2. Forward Flight—Lift is generated by the wings and all control is through the fixed wing surfaces (elevator, ailerons, rudder.)
3. Transition Up—This mode guides operation of a multiple of control surfaces when flying from Hover to Forward Flight.
4. Transition Down—This mode guides operation of a multiple of control surfaces when flying from Forward Flight to Hover.

The initial power-up flight mode of the vehicle 10 is Hover. The rotor generates control and lift. Pitch command 78 is generated by the remote operator R and/or the flight control law strategy 72. So long as the airspeed of the aircraft does not exceed the Transition Up threshold, the aircraft will remain in Hover mode. If the vehicle 10 is commanded to fly faster than the Transition Up threshold, Transition Up mode is entered. During this mode the aircraft is accelerating toward forward flight speed. During the transition Up mode, the transition logic circuit 134 compares the collective command 82 (also illustrated in FIG. 2) with a low thrust threshold 136 at a collective comparator 138. The low thrust threshold 136 is preferably defined as 0 degrees collective (flat pitch of rotor blades.)

As vehicle speed increases, the wings 60 (FIGS. 1A and 1B) create more lift and the flight control law strategy 72 must decrease the collective pitch command 82 (FIG. 2) to maintain the desired vertical control. When the collective pitch command 82 reaches the low thrust threshold 136, the transition logic circuit 134 toggles the latch 146 to hold the collective pitch command 82 at the low thrust threshold 136 and also sets all further cyclic controls (pitch 90 and roll 94; FIG. 2) to zero. That is, the rotors 56a, 56b (FIG. 1B) be maintained at flat collective pitch and are fixed in cyclic pitch. The flight mode is then changed to forward flight control of the pitch command 78 is returned to the remote operator R and/or the flight control law strategy 72. Thus, although the flight control law strategy 72 may generate appropriate pitch cyclic commands 90 and roll cyclic commands 94, the transition logic circuit 136 prevents those commands from being sent to the swashplates 57 (FIG. 1A) such that flat pitch and the resultant aerodynamic duct cover is maintained.

During Transition Up mode when the collective command 82 is enabled, the lift control algorithm 126 (FIG. 3) controls the pitch attitude. That is, the lift control enable switch 137 (FIG. 3) is switched such that the lift control algorithm 126 communicates with the lift summing circuit 128 to provide the transition pitch attitude reference 132 to the pitch command 78. The lift control algorithm 126 selects the proper control commands to affect an effective transition. The most efficient vehicle pitch during Transition Up is thereby automatically generated so that sufficient lift and control throughout the transition is maintained.

Forward flight mode is maintained so long as the vehicle speed at which the aircraft is commanded to fly exceeds the Transition Down Threshold. It should be understood that the Transition Down threshold is not necessarily the same as the Transition Up threshold.

Figure 8:
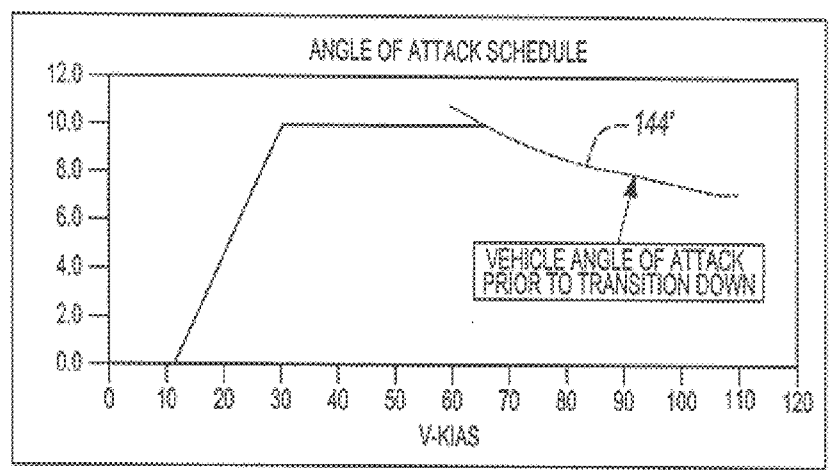
FIG. 8 is one embodiment of an exemplary angle of attack gain schedule for the vehicle of FIG. 1.

If the vehicle 10 is commanded to fly slower than the Transition Down threshold, Transition Down mode is entered. As vehicle speed decreases, the wings 60 generate less lift and the flight control law strategy 72 must increase their angle of attack to maintain desired vertical control. During the Transition Down mode, the transition logic circuit 134 compares the commanded pitch attitude reference 140 (angle of attack) with an angle of attack schedule 142 (FIG. 8) at an angle of attack comparator 144. The source of the commanded pitch attitude reference 140 is preferably the external pitch command R (FIG. 3) and/or the flight control law strategy 72 (FIG. 2). When the commanded pitch attitude reference 140 reaches an angle of attack threshold 144' (FIG. 8), the transition logic circuit 134 toggles the latch 146 enables the collective command 82 to resume control. That is, the collective command 82 is again directed to the collective control 98 such that other than flat pitch is available.

The angle of attack schedule 144 (FIG. 8; solid line) provide a predetermined relationship between pitch attitude and velocity of the vehicle 10. For example only, and as illustration FIG. 8, as the vehicle reduces velocity, its pitch attitude increases (angle of attack—dashed line) until its pitch attitude (dashed line) crosses the angle of attack schedule (solid line) at 68 kias and 10 degrees. It should be understood that the lines may cross and Transition Down mode entered anywhere along the angle of attack schedule 144.

During Transition Down mode when the collective command 82 is enabled, the lift control algorithm 126 (FIG. 3) controls the pitch attitude. That is, the lift control enable switch 137 (FIG. 3) is switched such that the lift control algorithm 126 communicates with the lift summing circuit 128 to provide the transition pitch attitude reference 132 to the pitch command 78. The lift control algorithm 126 selects the proper control commands to affect an effective transition. The most efficient vehicle pitch during Transition Down is thereby automatically generated so that sufficient lift and control throughout the transition is maintained.

Once the vehicle speed is reduced to a predetermined hover speed, Hover mode is again entered. Control of the pitch command 78 is returned to the remote operator R and/or the flight control law strategy 72.

Furthermore, while it is understood it still is worth stating that the present invention is not limited to a microprocessor based control system. The system may be implemented in a non-microprocessor based electronic system (either digital or analog).

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A flight control system for a hybrid aircraft comprising:
    a movable first control surface not operably connected to a rotor system operable to direct an aircraft about a pitch axis;
    a movable second control surface on a rotor system operable to direct the aircraft about said pitch axis;
    a storage device having a blending algorithm, said blending algorithm determining a first gain for said first control surface according to a first gain schedule, and determining a second gain for said second control surface according to a second gain schedule in response to a control input for said pitch axis; and
    a controller in communication with said first control surface, said second control surface, and said storage device, said controller operable to receive a control command for said pitch axis and actuate said first control surface according to said first gain and said second control surface according to said second gain.

2. The flight control system as recited in claim 1, wherein said first gain schedule and said second gain schedule relate control surface deflection to vehicle airspeed.

3. The flight control system as recited in claim 1, wherein said first control surface includes an elevator.

4. The flight control system as recited in claim 3, wherein said first control surface includes a flaperon.

5. The flight control system as recited in claim 1, wherein said second control surface includes a swashplate to effect a pitch cyclic change in a rotor system.

6. The flight control system as recited in claim 5, wherein said rotor system includes a coaxial counter rotating rotor system mounted within a duct.

7. The flight control system as recited in claim 1, wherein said hybrid aircraft is an unmanned aerial vehicle.

8. A method of controlling a hybrid aircraft about a pitch axis comprising the steps of:
    (1) providing a control command for a pitch vehicle axis;
    (2) splitting said control command to provide a first control command and a second control command;
    (3) multiplying said first control command by a first gain according to a first gain schedule to provide a first scaled control command;
    (4) multiplying said second control command by a second gain according to a second gain schedule to provide a second scaled control command;
    (5) communicating said first scaled control command to a first movable control surface not operably connected to a rotor system for control of the hybrid aircraft about the pitch axis; and
    (6) communicating said second scaled control command to a second movable control surface on a rotor system for control of the hybrid aircraft about the pitch axis.

9. A method as recited in claim 8, wherein said step (1) includes a proportional plus integral control command.

10. A method as recited in claim 9, further including limiting said integral control command.

11. A method as recited in claim 9, further including limiting said second scaled control command.

12. A method as recited in claim 11, further including:
    identifying when the limit of said second scaled control command is reached; and
    holding an integral control command of said second control command in a limited direction in response to said identifying step.

13. A method as recited in claim 11, further including:
    identifying when the limit of said second control command is reached; and
    adding in said first control command to assist said second control command.

14. A method as recited in claim 8, wherein said first and second scaled control command provide the same amount of aircraft pitch moment about the pitch axis independent of the hybrid aircraft flight regime.

15. A method of controlling a hybrid unmanned aerial vehicle (UAV) about a pitch axis within a transition flight region comprising the steps of:
    (1) providing a control command for a pitch axis;
    (2) splitting said control command to provide a first control command and a second control command;
    (4) multiplying said first control command by a first gain according to a first gain schedule to provide a first scaled control command;
    (4) multiplying said second control command by a second gain according to a second gain schedule to provide a second scaled control command;
    (7) communicating said first scaled control command to a rotor system for control of the UAV about the pitch axis; and
    (8) communicating said second scaled control command to an elevator for control of the UAV about the pitch axis.

16. A method as recited in claim 15, wherein said step (1) includes aproportional plus integral control command.

17. A method as recited in claim 15, wherein said first and second scaled control command provide the same amount of pitch moment about the pitch axis independent of the UAV flight regime.

18. A method as recited in claim 15, further including limiting said second scaled control command.

19. A method as recited in claim 18, further including:

identifying when the limit of said second control command is reached; and adding in said first control command to assist said second control command.

\* \* \* \* \*